(12) United States Patent
Marom

(10) Patent No.: US 6,738,540 B2
(45) Date of Patent: May 18, 2004

(54) OPTICAL CROSS-CONNECT SWITCH USING PROGRAMMABLE MULTIPLEXERS/DEMULTIPLEXERS

(75) Inventor: Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 273 days.

(21) Appl. No.: 09/944,801

(22) Filed: Aug. 31, 2001

(65) Prior Publication Data

US 2002/0197000 A1 Dec. 26, 2002

Related U.S. Application Data

(60) Provisional application No. 60/300,272, filed on Jun. 22, 2001.

(51) Int. Cl.[7] ............................................. G02B 6/26
(52) U.S. Cl. ...................................................... 385/17
(58) Field of Search ............................. 385/16, 17, 18, 385/24, 37; 398/56, 57, 68, 69, 79

(56) References Cited

U.S. PATENT DOCUMENTS

| | | | |
|---|---|---|---|
| 5,065,396 A | * 11/1991 | Castellano et al. | 370/536 |
| 5,600,466 A | * 2/1997 | Tsushima et al. | 398/79 |
| 5,610,744 A | * 3/1997 | Ho et al. | 398/58 |
| 5,790,288 A | * 8/1998 | Jager et al. | 398/75 |
| 6,055,698 A | * 5/2000 | De Guzman | 15/260 |
| 6,351,581 B1 | * 2/2002 | Doerr et al. | 385/24 |
| 6,392,769 B1 | * 5/2002 | Ford et al. | 398/9 |

* cited by examiner

Primary Examiner—Javaid H. Nasri
Assistant Examiner—Thanh-Tam Le
(74) Attorney, Agent, or Firm—Barry H. Freedman

(57) ABSTRACT

An optical cross connect switch includes a programmable demultiplexer placed on every input transmission port, a programmable multiplexer placed on every output transmission port, and a linking fiber between every programmable demultiplexer and multiplexer in the system. The programmable demultiplexers and multiplexers handle internally all the optical communication channels, and can route any specified optical channel from an input port to the desired output port. Advantageously, the arrangement can send several input channels to the same output port, and can efficiently handle a large optical communication channel count, offer a scalable cost-effective solution for expanding switching capacity, and reduce the fiber interconnection count between switch modules. When a new optical communication system is added to the node, it requires only that a programmable multiplexer and demultiplexer be placed on its output and input fibers, respectively, and fibers connected to its neighboring programmable multiplexers and demultiplexers. The arrangement thus scales proportionally with the number of input line systems to the switch, regardless of the number of optical channels, and thus provides a pay as you grow solution. The cross connect can be modified to provide add-drop functionality, and some of the programmable multiplexers/demultiplexers can be replaced with passive or conventional devices.

24 Claims, 7 Drawing Sheets

OPTICAL CROSS-CONNECT SWITCH USING PROGRAMMABLE MULTIPLEXERS/DEMULTIPLEXERS

CROSS-REFERENCE TO RELATED APPLICATION

This application claims priority of Provisional Application Serial No. 60/300,272 which was filed on Jun. 22, 2001.

FIELD OF THE INVENTION

The present invention relates to optical communications, and more particularly to an optical cross connect switch using programmable multiplexers and demultiplexers to switch optical wavelength division multiplexed (WDM) channels among multiple inputs and outputs in an optical communication system.

BACKGROUND OF THE INVENTION

The transmission capacity of fiber-optic communication systems has increased significantly with the wavelength division multiplexing technique. In a WDM system, multiple channels, where each channel is differentiated by the use of a different wavelength of light, carry modulated optical signals in a single optical fiber. Optical multiplexers are used at the transmitter to combine all the optical channels into the fiber for transmission, and optical demultiplexers are used at the receiver to separate the optical channels for detection.

In an optical network, network traffic can be routed from a source to a destination via one or more intermediate nodes, each of which is connected to a plurality of neighboring nodes. Accordingly, each intermediate node requires some switching or cross connection capability to select an appropriate neighboring node in order to route the traffic towards the desired destination. An intermediate node can operate electronically, by (a) terminating wavelength channels at a receiver endpoint, (b) switching the traffic with electronic means, and (c) originating the wavelength channels at transmitter points. Alternatively, the switching nodes can operate transparently, routing the individual optical channels without opto-electronic conversion. Regardless, intermediate nodes are required to switch incoming wavelength channels from an input port to a desired output port, so that a channel originating at an upstream node can pass through the intermediate node enroute toward its downstream node destination.

FIG. 1 illustrates the topology of a prior art optical communications system network node with conventional switching functionality. The network node has several input transmission ports 110, 120 and 130 carrying multiplexed optical channels and several output transmission ports 154, 164 and 174 carrying the outbound multiplexed optical channels. Each input multiplexed channel, e.g. the channel on input transmission port 110, is demultiplexed by a demultiplexer 112, separating the optical channels on distinct demultiplexer ports such that optical channel with wavelength $\lambda_1$ appears on demultiplexer port 114-1, the optical channel with wavelength $\lambda_2$ appears on demultiplexer port 114-2, and so on, through optical channel with wavelength $\lambda_N$ which appears on demultiplexer port 114-N. The demultiplexed optical channels from all the input ports 110, 120 and 130, having been demultiplexed by demultiplexers 112, 122 or 132, are introduced to the input ports 180-1 through 180-3N of a cross connect switch 140, which independently routes traffic at each input port towards any one of the cross connect switch output ports 190-1 through 190-3N. These switch output ports are connected to the multiplexer ports 150-1 through 150-N, 160-1 through 160-N and 170-1 through 170-N of multiplexers 152, 162, and 172, respectively, which combine or multiplex each of the channels onto one of the output transmission ports 154, 164 or 174. In order to connect each input channel to the appropriate one of the output transmission ports 154, 164 or 174, cross connect 140 must be arranged to interconnect each of its input ports 180-1 through 180-3N with the appropriate one of its output ports 190-1 through 190-3N.

Cross-connect switch 140 can be implemented by either electronic or optical switching fabrics. The number of cross-connect switch ports has to be as large as the number of input transmission ports times the number of optical channels received via each such port, which typically requires the number of cross-connect switch ports to be in the hundreds or higher.

Instead of the arrangement of FIG. 1, the alternative prior art architecture shown in FIG. 2 may be used. All the input optical channels arriving at input transmission ports 210, 220 and 230 are demultiplexed in demultiplexers 212, 222 and 232 in a similar fashion to the arrangement of FIG. 1. However, switching is performed by a cluster of small cross connect switches 240-1, 240-2, 240-N, each switch handling a single optical wavelength channel. For example, all of the demultiplexer ports 214-1, 224-1 and 234-1 carrying channels with wavelength $\lambda_1$ are switched by cross connect switch 240-1 to the proper multiplexer port 250-1, 260-1, or 270-1 of multiplexers 252, 262 and 272, respectively. Likewise, for a different wavelength 2, demultiplexer ports 214-2, 224-2 and 234-2 carry channels with that wavelength to cross connect switch 240-2 and thence to the proper multiplexer ports 250-2, 260-2, or 270-2. This arrangement requires an individual cross connect for each of the optical channels. The port count of each cross connect switch is determined by the number of input transmission ports. Since the trend in optical communication systems is to increase the number of optical channels from a few hundred today to over a thousand in the future, the arrangement of FIG. 2 does not scale well and will undesirably require a massive fiber interconnect patch panel.

SUMMARY OF THE INVENTION

In accordance with the present invention, an optical cross-connect switch is based on and uses the programmable optical multiplexer/demultiplexer as described in co-pending application Ser. No. 09/944,800 filed on Sep. 31, 2001 and assigned to the same assignee as the present application. As described in the aforementioned co-pending application, a programmable optical demultiplexer is arranged to receive a multiplexed optical signal containing a plurality of separate channels, each with an associated wavelength, and independently assign each input optical channel to a desired output port. Likewise, a programmable optical multiplexer is arranged to receive a plurality of separate optical channels, each with an associated wavelength, and combine the different wavelengths into a single multiplexed optical signal that is made available at the multiplexer output port.

In accordance with one embodiment of the present invention, an optical cross connect switch includes a programmable demultiplexer placed on every input transmission port, a programmable multiplexer placed on every output transmission port, and a linking fiber between every programmable demultiplexer and multiplexer in the system.

The programmable demultiplexers and multiplexers handle internally all the optical communication channels, and can route any specified optical channel from an input port to the desired output port. Advantageously, the arrangement can send several input channels to the same output port.

In accordance with other embodiments of the present invention, an optical cross connect switch is arranged to both add and drop WDM channels. The added and/or dropped channels are coupled to/from the previously mentioned programmable multiplexers/demultiplexers via additional linking fibers, through the use of additional multiplexers and demultiplexers, which may be conventional or programmable.

In accordance with yet other embodiments of the present invention, either the programmable multiplexers or programmable demultiplexers are replaced by passive combiners or splitters, and concentrators and/or distributors are incorporated in order to reduce the number of transmitters and/or receivers required in the cross connect implementation, and to thereby allow the transmitters and/or receivers that are used to be shared.

The cross connect switch arrangement of the present invention efficiently handles a large optical communication channel count, offers a scalable cost-effective solution for expanding switching capacity, and reduces the fiber interconnection count between switch modules. When a new optical communication system is added to the node, it requires only that a programmable multiplexer and demultiplexer be placed on its output and input fibers, respectively, and fibers connected to its neighboring programmable multiplexers and demultiplexers. The arrangement thus scales proportionally with the number of input line systems to the switch, regardless of the number of optical channels, and provides a pay as you grow solution.

BRIEF DESCRIPTION OF THE DRAWING

The present invention will be more fully appreciated by consideration of the following detailed description, which should be read in light of the drawing in which.

DETAILED DESCRIPTION

Figure 3A:
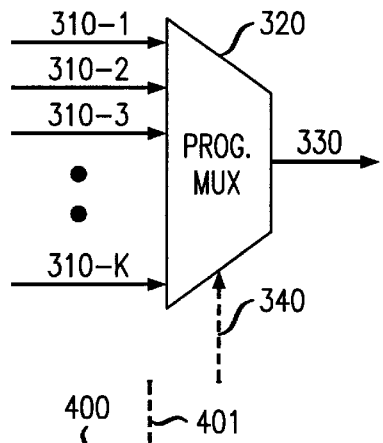
FIGS. 3(a) and 3(b) are illustrations of a programmable multiplexer and demultiplexer, respectively, in accordance with applicants' co-pending application, that are the building blocks of the present invention.

The present invention describes new architectures for implementing an optical cross-connect that advantageously makes use of the programmable optical multiplexer/demultiplexer described in applicant's co-pending application identified above. For the purposes of completeness, the functionality of those elements is described in connection with FIGS. 3(a) and 3(b) herein. As illustrated in FIG. 3(a), a programmable optical multiplexer 320 has K multiplexer input ports 310-1 through 310-K and a single multiplexer output port 330. Each of the multiplexer input ports can receive an optical signal containing one or more optical channels, $\lambda$-1 through $\lambda$-N, provided the wavelengths of the channels are different. The optical signals are combined in the multiplexer, and emerge as a composite signal at multiplexer output port 330. Operationally, multiplexer 320 establishes a unique pathway for each optical channel between any one of the multiplexer input ports 310-1 through 310-K and the multiplexer output port 330, as prescribed by a control signal 340, physically preventing the detrimental possibility of combining two optical channels operating on the same wavelength from two different multiplexer input ports.

Figure 3B:
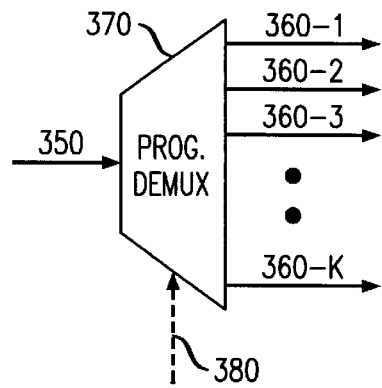

The programmable multiplexer of FIG. 3(a) can also be operated in the reverse direction and function as a programmable demultiplexer, as shown in FIG. 3(b). A single demultiplexer input port 350 receives a multiplexed optical signal containing a plurality of wavelengths or channels, and separates the signal so that one or more of the channels appears at each of the demultiplexer output ports 360-1 through 360-M. The assignment of specific channels to demultiplexer output ports is independent, and is determined by a control signal on input 370.

Figure 4:
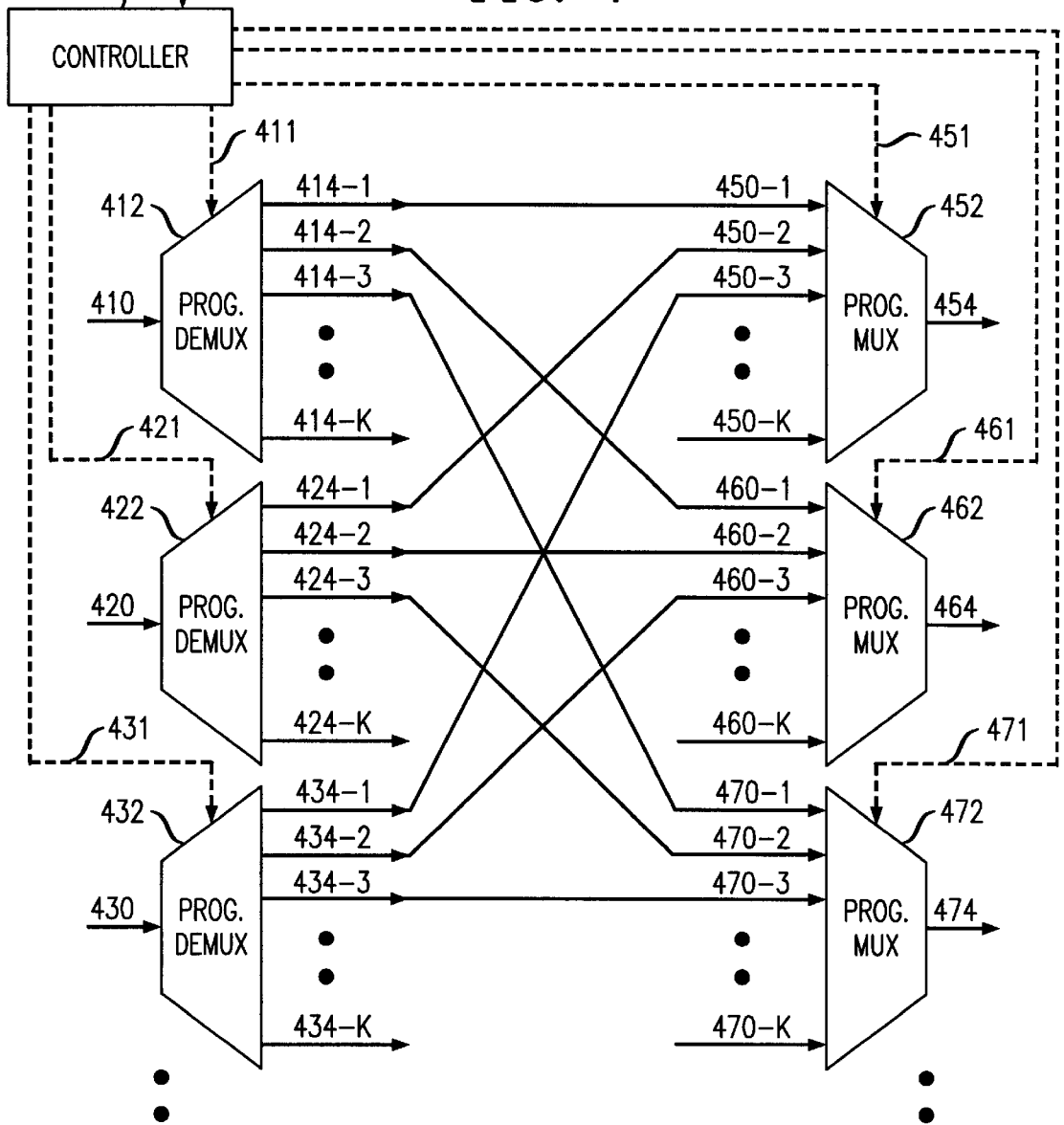
FIG. 4 is an illustration of an embodiment of an optical cross connect switch arranged in accordance with the present invention to use programmable multiplexers and demultiplexers.

Referring now to FIG. 4, there is shown an embodiment of an optical cross connect switch arranged in accordance with the present invention. The optical cross connect's input ports 410, 420 and 430 each carry a plurality of multiplexed optical channels at wavelengths $\lambda_1$ through $\lambda_N$ that are each to be independently assigned to a desired output port 454, 464 or 474, as prescribed by a control signal 401. Note that while FIG. 4 shows three input/output ports, this is for illustrative purposes only, and the number of ports can be fewer or greater, and the number of input ports does not have to be equal to the number of outputs ports. Each input port 410, 420 and 430 is connected to a respective programmable demultiplexer 412, 422 and 432, and each output port is preceded by a respective programmable multiplexer 452, 462 and 472. Programmable demultiplexers 412, 422 and 432 each have a single programmable demultiplexer input port 410, 420 and 430 (which correspond to the optical input ports of the cross connect) and K programmable demultiplexer output ports 414-1 through 414-K, 424-1 through 424-K, and 434-1 through 434-K, where K is an integer greater than one and typically less than the number of wavelengths N, while programmable multiplexers 452, 462 and 472 have K programmable multiplexer input ports 450-1 through 450-K, and 460-1 through 460-K, and 470-1 through 470-K, and a single programmable multiplexer output port 454, 464 and 474 (which correspond to the optical output ports of the cross connect). As indicated previously, programmable demultiplexers 412, 422 and 432 and programmable multiplexer 454, 464 and 474 are each arranged in accordance with applicant's copending application identified above. One programmable demultiplexer output port (414-1 through 414-K, 424-1 through 424-K, and 434-1 through 434-K) of each programmable demultiplexer 412, 422 and 432, respectively, is connected by an optical fiber link to an available programmable multiplexer input port (450-1 through 450-K, 460-1 through 460-K, and 470-1 through 470-K) of the different programmable multiplexers 454, 464 and 474. The arrangement of the linking fibers is such that there is thus "complete" interconnection between the demultiplexers 412, 422 and 432 and the multiplexers 454, 464 and 474. With this interconnection, at least one output from every demultiplexer can be routed to at least one input of each multiplexer via an individual optical fiber link. Stated differently, this means that each of the demultiplexers can be connected by the cross connect switch to any of the multiplexers via a single hop.

Still referring to FIG. 4, the connection or routing of each specific channel from cross connect input ports 410, 420 and 430 to one of desired cross connect output ports 454, 464 and 474 is prescribed by control signal 401, which is input to a controller 400. That controller in turn applies individual control signals 411, 421 and 431 to programmable demultiplexers 412, 422 and 432, and individual control signals 451, 461 and 471 to programmable multiplexers 452, 462 and 472, respectively, so that the cross connect establishes desired optical pathways for each input wavelength λ via a programmable demultiplexer arranged to receive the input wavelength λ on one of its input ports, an optical fiber link, and a programmable multiplexer having an output port to which wavelength λ is destined.

If each of the input ports 410, 420 and 430 and each of the output ports 454, 464, and 474 can carry N optical channels, then the total switching capacity of the cross connect switch is (K+1)*N optical channels.

An exemplary path for an optical channel $\lambda_5$ originating at input port 410 and destined for output port 464 is through the programmable demultiplexer 412, which routes $\lambda_5$ to the port that is connected to the desired line system. In our example, the optical channel would emerge on demultiplexer port 412-2, which routes 5 to multiplexer port 460-1 of programmable multiplexer 462 via a fiber link. The programmable multiplexer reconfigures to interconnect multiplexer port 460-1 to output port 464 for $\lambda_5$, completing the signal path. Since the programmable multiplexer/demultiplexer devices can carry multiple optical channels on every demultiplexed port, the fact that $\lambda_5$ is traversing through the fiber that interconnects programmable demultiplexer 412 to programmable multiplexer 462 does not prevent other optical channels from sharing the same pathway via the interconnecting fiber link, thus concurrently supporting all the optical channels that are interchanged between the same input and output ports at the cross connect.

Figure 1:
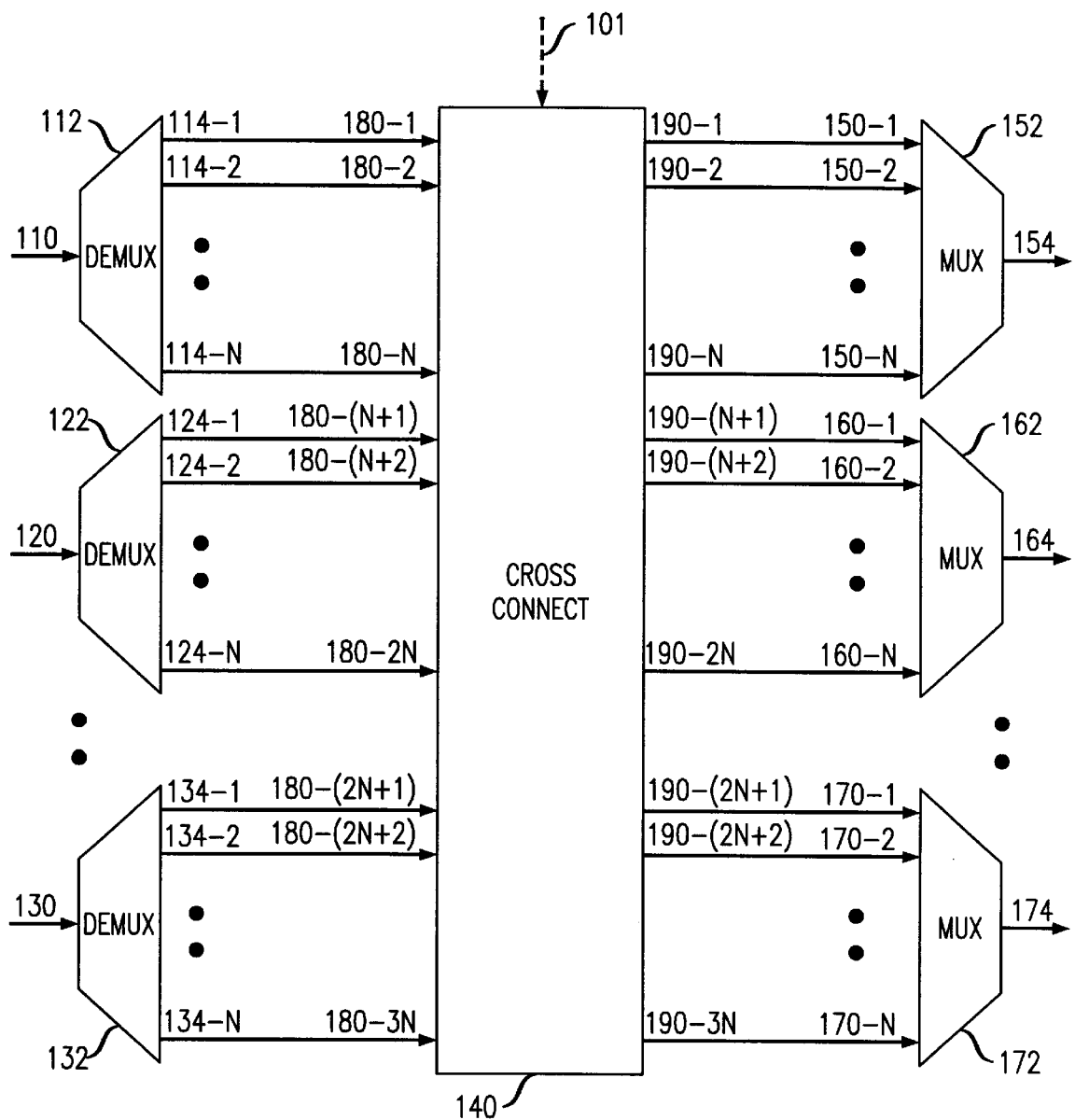
FIG. 1 is an illustration of a network node with a conventional cross connect.
Figure 2:
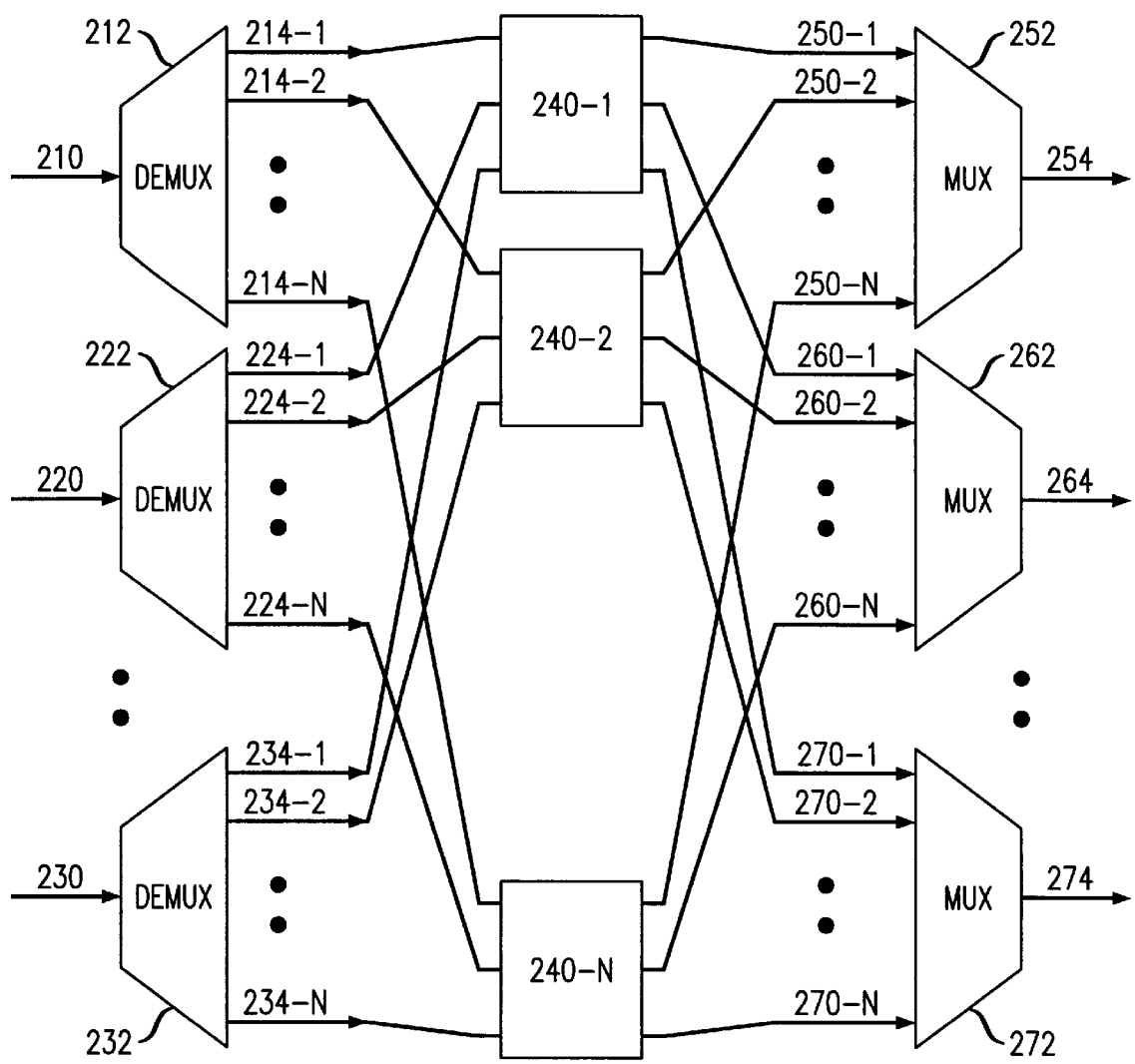
FIG. 2 is an illustration of a network node with a conventional wavelength level cross connect.

The switch architecture of FIG. 4 has several desirable properties. Typically when an optical cross connect node is first put into service, it interconnects relatively few optical line system, each carrying relatively few optical channels. When the network operator decides to add more optical channels to the system, a field technician is not required to modify the cross connect, since all the optical channels can advantageously be handled internally by the programmable multiplexers and demultiplexers. This is not the case in the prior art illustrated in FIGS. 1 and 2.

With the arrangement of the present invention, when a new line system is installed and attaches to the node, the only modification that is required is to attach the new system's demultiplexer and multiplexer to the existing multiplexers and demultiplexers, respectively, via fiber links, and to connect control inputs to these elements from controller 400. This is typically very simple, as the number of line systems connected to a node is typically a small number. When the cross connect is fully populated by line systems (K+1 systems), the number of fibers that interconnect the input and output systems is only K(K+1). This compares very favorably with the solutions of FIGS. 1 and 2, which require 2*(K+1)*N fibers (as K<<N, typically). The cost of the cross connect also grows proportionally to the number of input/output line systems, such that the initial cost is low, when few ports are populated. This allows for a low start-up cost and future revenues as the system expands (a pay as you grow architecture).

Figure 5:
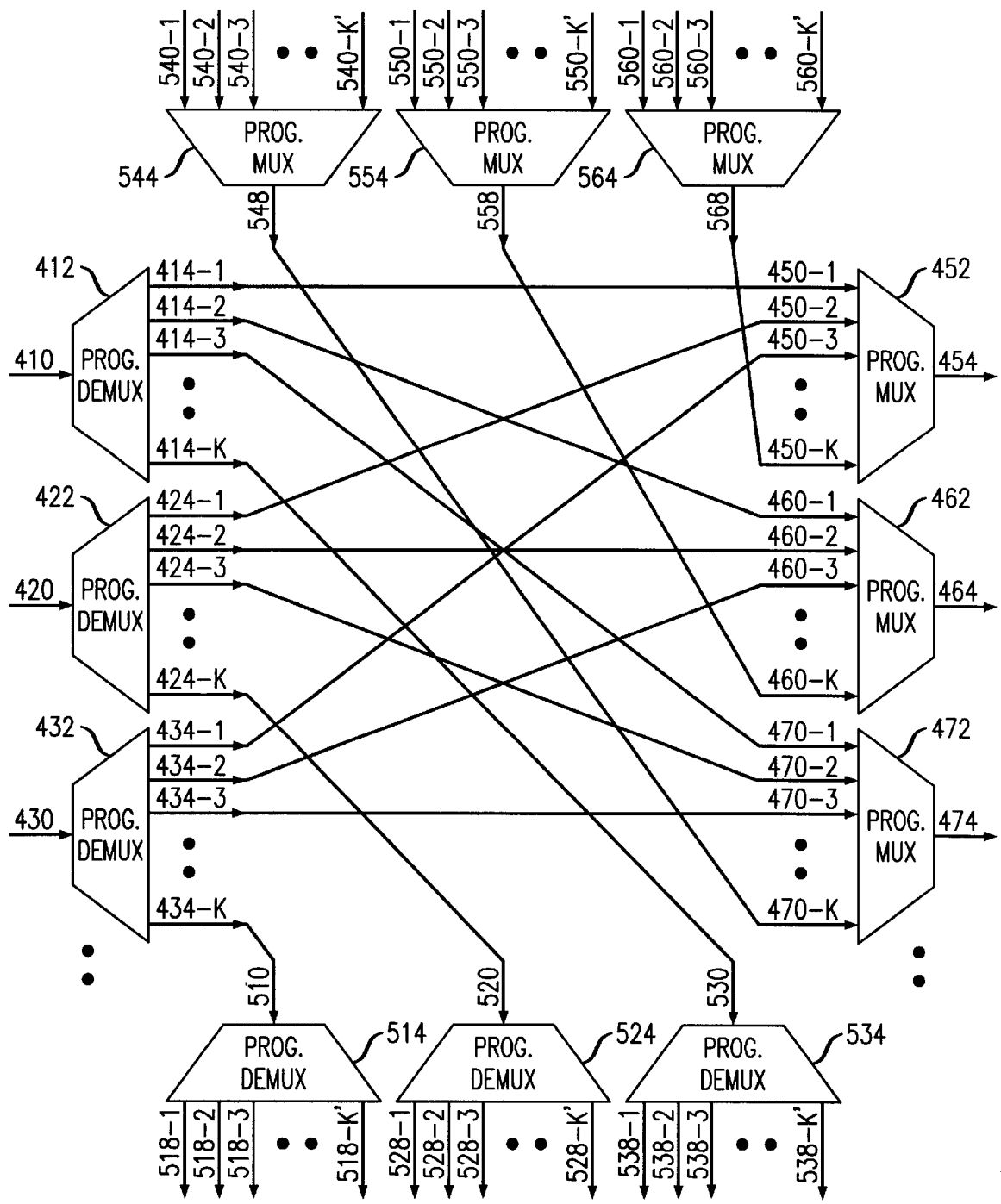
FIG. 5 is an illustration of an embodiment of a cross connect switch in accordance with the present invention, having channel add and drop capability.

FIG. 5 illustrates a cross-connect switch with reconfigurable optical channel add and drop capability. In this embodiment, the input and output ports 410, 420 and 430, and 454, 464 and 474, as well as the programmable demultiplexers 412, 422 and 432, programmable multiplexers 452, 462 and 472, and the interconnecting linking fibers, are largely the same as in FIG. 4, and the same numbering is retained. However, in this embodiment, at least one output port of each programmable demultiplexer 412, 422 and 432 is devoted for the drop channels, and at least one input port of each programmable multiplexer 452, 462 and 472 is devoted to the add channels. The dropped optical channels that are routed to the programmable demultiplexer output port designated for the drop channels are demultiplexed by a second demultiplexer that can be programmable or conventional, while the added optical channels that are routed to the programmable multiplexer input port designated for the add channels are first multiplexed by a second multiplexer that can also be programmable or conventional. Thus, a large number of added channels can be inserted at the input ports of the second programmable multiplexers, and at the output ports of the second programmable demultiplexer, a large number of dropped channels can be directly detected.

The optical channels to be dropped arrive at one of the input ports 410, 420 or 430, and are applied by the corresponding one of the programmable multiplexers 412, 422 or 432 to the programmable multiplexer output port 414-K, 424-K or 434-K that is assigned to dropped channels. These programmable multiplexer output ports are connected, via linking fibers, to respective second programmable demultiplexer 514, 524 or 534, connected the dropped channel to an available output port 518-1 through 518-K', 528-1 through 528-K' or 538-1 through 538-K'. An example path of a dropped channel entering the cross connect of FIG. 5 from input port 420 is through programmable demultiplexer 422 to programmable demultiplexer output port 424-K, which is connected via a linking fiber to the programmable demultiplexer input port 520 of programmable demultiplexer 524 that assigns the dropped channel to an available one of the programmable demultiplexer output ports 528-1 through 528-K'. Note that the programmable demultiplexer output port count of the second programmable demultiplexer 524 does not have to be identical to that of the first programmable demultiplexer 422, and, as indicated above, a conventional demultiplexer can also be used.

The added channels undergo a similar process to that described for the drop channels, but use two-stage multiplexing rather than two-stage demultiplexing. The added optical channels are inserted at one of the programmable multiplexer input ports 540-1 to 540-K', 550-1 to 550-K', or 560-1 to 560-K' of a first programmable multiplexer 544, 554 or 564, which is connected to an input port 470-K, 460-K or 450-K of a corresponding second programmable multiplexer 472, 462 or 452, that is designated to receive added channels. An example path of an added channel that is destined for output port 474 is to originate at one of the programmable multiplexer input ports 540-1 to 540-K' of programmable multiplexer 544, whose programmable multiplexer output port 548 is connected to the input port 470-K of programmable multiplexer 472 that multiplexes all the channels to the desired output port 474. The added channels can utilize tunable wavelength laser sources at programmable multiplexer input ports 540-1 to 540-K', allowing the cross-connect with add/drop capability to fit well in a networking environment where optical channels may change often. Note, as indicated above, that conventional multiplexers can also be used with fixed wavelength lasers. Note that some or all of the programmable multiplexer input ports 540-1 to 540-K', 550-1 to 550-K' and 560-1 to 560-K' can simultaneously receive more than one wavelength or channel, i.e., the ADD channels input to one or more programmable multiplexer input ports of one or more programmable multiplexers 544, 554 and 564 can itself be a multiplexed optical signal. Likewise, some or all of the programmable demultiplexer output ports 414-1 to 414-K, 424-1 to 424-K and 434-1 to 434-K can simultaneously receive more than one wavelength or channel, i.e., the DROP channels input to one or more demultiplexers 510, 520 and 530 can itself be a multiplexed optical signal. Also note that optical detection may, instead of being performed directly at the drop port, be performed at a remote location, such as at a customer's premises. In that case, several dropped channels can be assigned to the drop port that leads to the customer for demultiplexing and detection of the multiple optical channels.

The add-drop arrangement of FIG. 5 (as well as the arrangement of FIG. 6, described below) can be easily modified to perform wavelength conversion or regeneration, by (a) first dropping one or more wavelength channels, (b) converting the existing wavelengths to different wavelengths, or regenerating the modulated signals on the same wavelength carriers, in separate converters or regenerators, not shown, which operate either optically or through an optical/electrical/optical conversion, and (c) then adding the new wavelength channels or the regenerated signals so that they are available at a cross connect output port.

Figure 6:
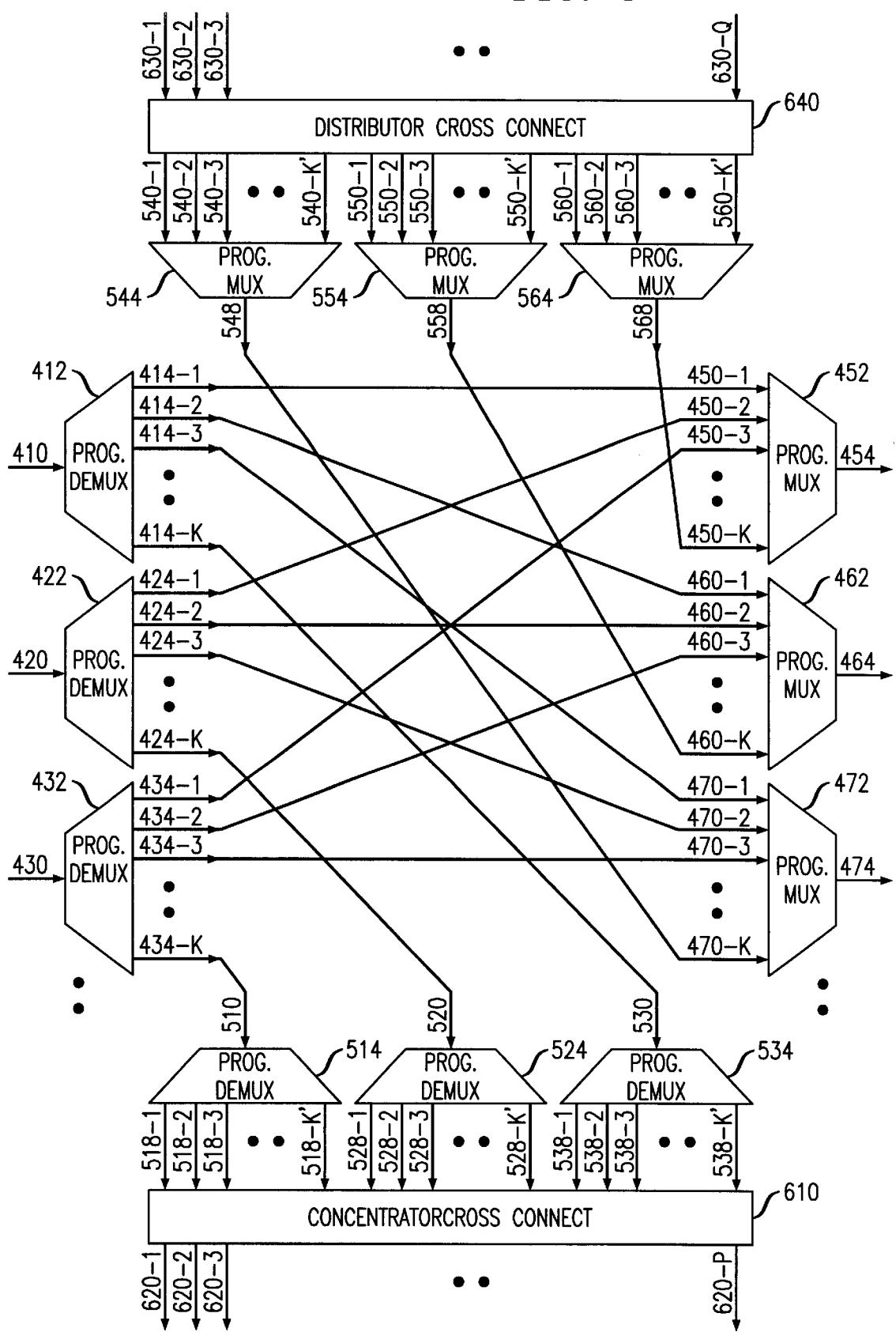
FIG. 6 is an illustration of a cross connect switch with channel add and drop capability and sharing of local receivers and transmitters.

FIG. 6 illustrates a variation of the previously described cross-connect with add/drop capability shown in FIG. 5, and retains the same designations for like elements. The arrangement of FIG. 6 may be preferable to better utilize installed transmitter and receiver equipment associated with the add/drop channels. Specifically, in the arrangement of FIG. 5, each of the programmable demultiplexer output ports 518-1 through 518-K', 528-1 through 528-K' and 538-1 through 538-K' normally has an associated drop channel receiver, and each of the programmable multiplexer input ports 540-1 through 540-K', 550-1 through 550-K' and 560-1 through 560-K' normally has an associated add channel transmitter. These drop channel receivers and add channel transmitters are, in the implementation of FIG. 5, "dedicated", in the sense that each input port 410, 420 or 430, which is typically connected to a different input line system, can only route drop channels to certain receivers, and each output port 454, 464 and 474, which is typically connected to a different output line system, can only receive add channels from certain transmitters. However, it may be wiser to share the receivers and transmitters across all input/output ports, as add or drop channel demand may shift, over time, from one input or output line system to another line system.

Still referring to FIG. 6, additional cross-connect switches 610 and 640 that respectively function as a concentrator for the drop channels (many input ports, fewer output ports) and as a distributor for the add channels (fewer input ports, many output ports) may be included. With respect to the drop channels, the programmable demultiplexer output ports 518-1 through 518-K', 528-1 through 528-K' and 538-1 through 538-K' of the programmable demultiplexers 514, 524 and 534 enter concentrator cross connect switch 610, which has a number of input ports equal to the cumulative number output ports of all of the programmable demultiplexers 514, 524 and 534. The number of output ports P of concentrator cross connect 610 is determined by the number of receivers available at the node, which is a system design consideration, and will in any event permit the receivers to be shared. Thus, any dropped channel from any line system can appear at any one of the output drop ports 620-1 through 620-P.

With respect to the add channels, the programmable multiplexer input ports 5401 through 540-K', 550-1 through 550-K' and 560-1 through 560-K' of the programmable multiplexers 544, 554 and 564 exit concentrator cross connect switch 640, which has a number of output ports equal to the cumulative number input ports of all of the programmable multiplexers 544, 554 and 564. The number of input ports Q of concentrator cross connect 640 is determined by the number of transmitters available at the node, which is also a system design consideration, and will in any event permit the transmitters to be shared. Thus, any added channel from any line system can originate at any one of the input add ports 630-1 through 630-Q. Note that P and Q are integers that can be equal or unequal.

Note that it is possible to carry out the implementation of FIG. 6 with conventional (i.e., static) demultiplexers and multiplexers connected to the concentrator and distributor cross connects, instead of programmable multiplexers and programmable demultiplexers. However this solution would require a large port count concentrator and distributor cross connect.

Figure 7:
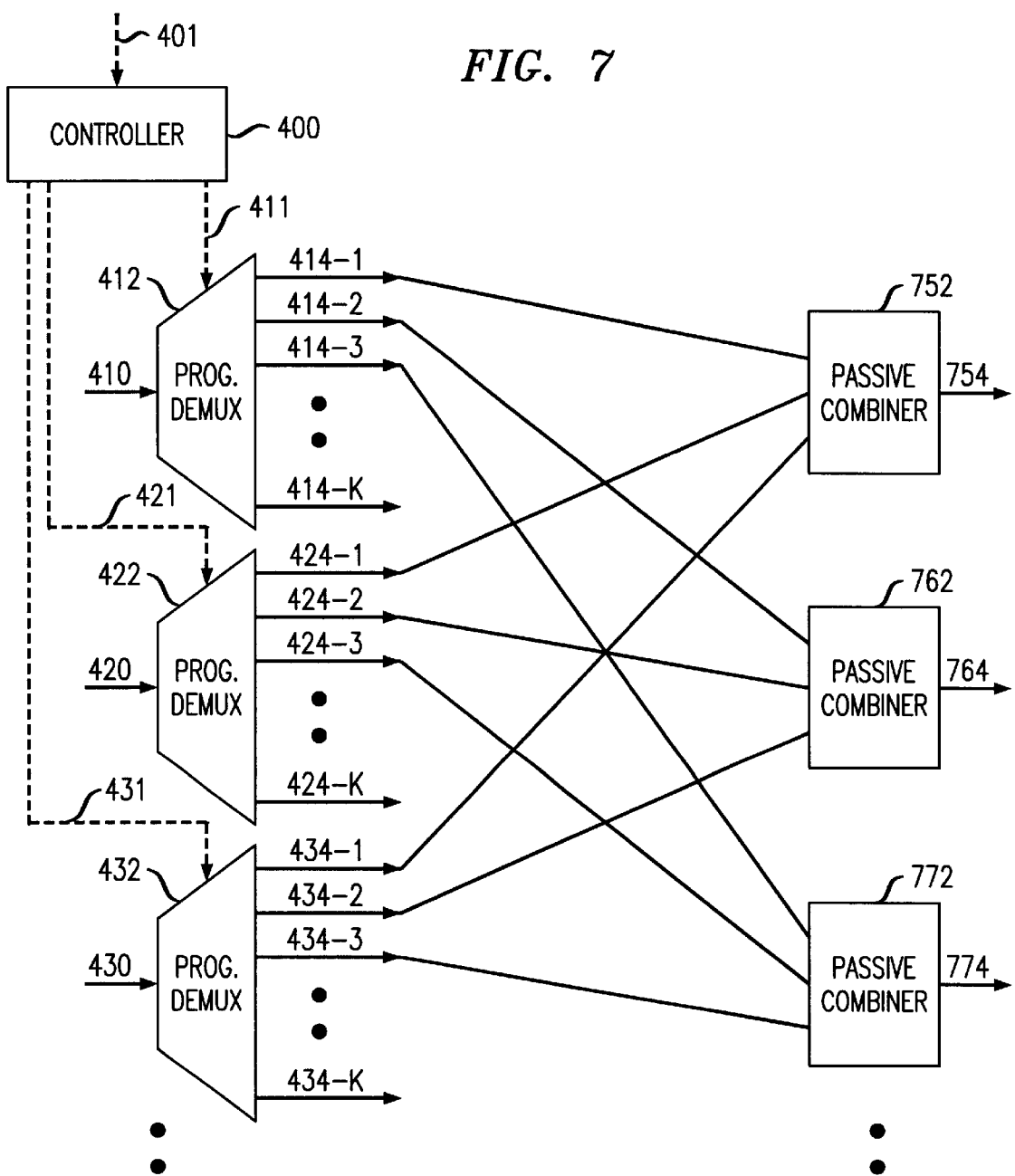
FIG. 7 is an illustration of an embodiment of an optical cross connect switch arranged in accordance with the present invention to use programmable demultiplexers and passive combiners.

Referring now to FIG. 7, there is shown an illustration of an embodiment of an optical cross connect switch arranged in accordance with the present invention to use programmable demultiplexers and passive combiners. This type of arrangement (and that described below in connection with FIG. 8) can be a replacement for the arrangement of FIG. 4 when it is desired to reduce cost by substituting passive devices in place of the programmable multiplexers (or in the case of FIG. 8, in place of the programmable demultiplexers) However, it is to be noted that in this arrangement, optical losses can be greater, due to the inherent lossy nature of passive splitters and couplers.

In FIG. 7, each of the programmable multiplexers 452, 462 and 472 of FIG. 4 is replaced by a respective passive combiner 752, 762 and 772. The passive combiners, which may be multi-port couplers or other similar passive devices, simply merge all of the wavelengths received at their respective input ports onto a single output port 754, 764 and 774, respectively, but have a higher optical loss than the programmable multiplexers of FIG. 4. Control signals 451, 461 and 471 of FIG. 4 are not required in this embodiment. The control signals 411, 421 and 431 controlling programmable demultiplexers 412, 422 and 432 are the same as in FIG. 4.

Figure 8:
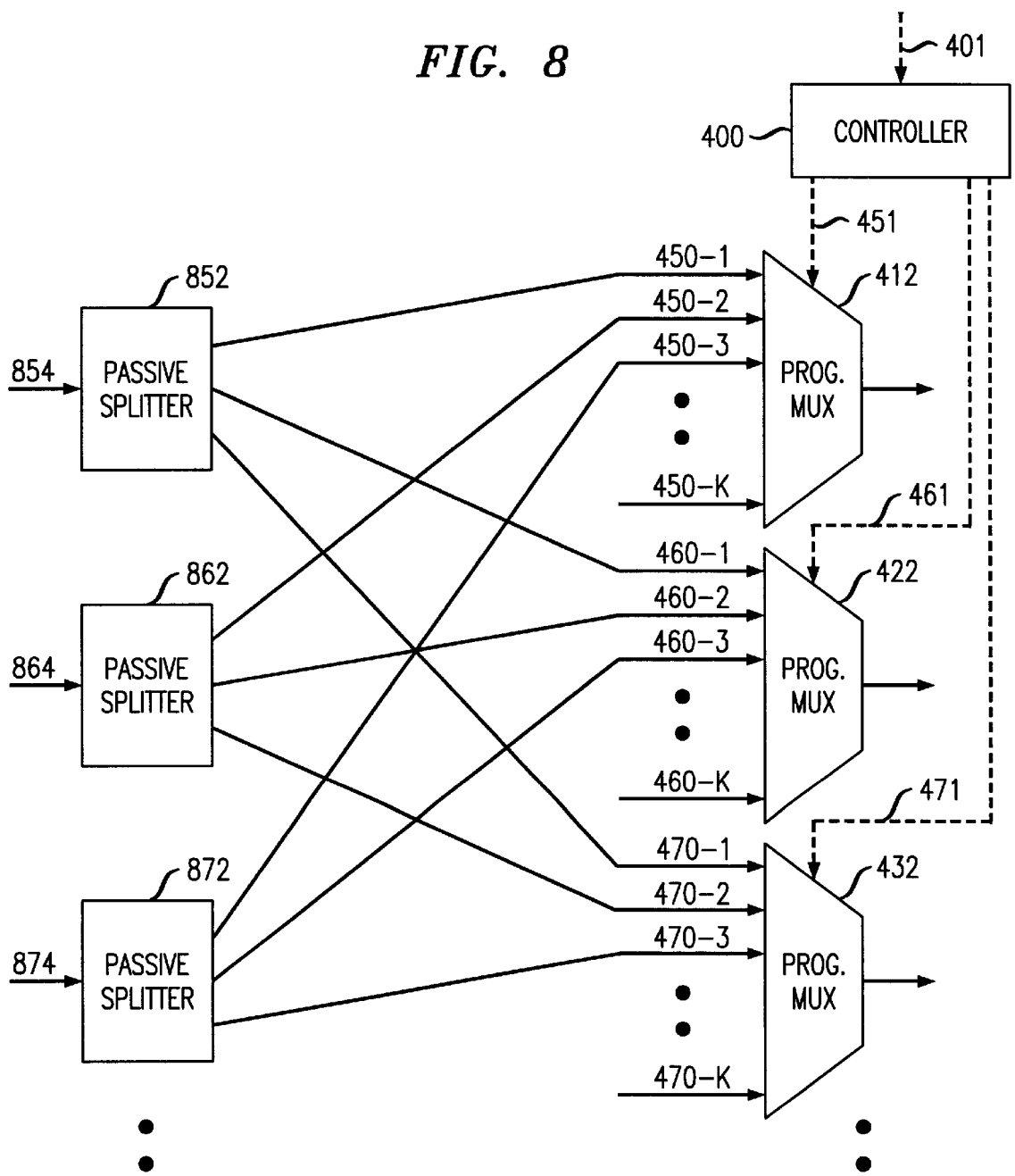
FIG. 8 is an illustration of an embodiment of an optical cross connect switch arranged in accordance with the present invention to use programmable multiplexers and passive splitters.

In FIG. 8, each of the programmable demultiplexers 412, 422 and 432 of FIG. 4 is replaced by a respective passive splitter 712, 722 and 732. The passive splitters, which may be multi-port couplers or other similar passive devices, simply replicate all of the wavelengths received at their respective input ports 710, 720 and 730 onto all of their output ports, but have a higher optical loss than the programmable demultiplexers of FIG. 4. Control signals 411, 421 and 431 of FIG. 4 are not required in this embodiment. The control signals 451, 461 and 471 controlling programmable multiplexers 452, 462 and 472 are the same as in FIG. 4. In this embodiment, programmable multiplexers 452, 462 and 472 serve to select the desired wavelength to be coupled from its programmable multiplexer input ports 450-1 through 450-K, 460-1 through 460-K, and 470-1 through 470-K to each one of its programmable multiplexer output ports 454, 464 and 474.

It should be further understood that the arrangements shown in FIGS. 5 and 6 can each also be modified so that either the programmable multiplexers or the programmable demultiplexers are replaced by passive optical combiners or optical splitters, respectively, in a manner analogous to that just described. Furthermore, the add side channels can be multiplexed by a passive optical combiner, such as a multiport coupler or a conventional multiplexer. Moreover, the drop side channels can be separated by a conventional demultiplexer.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. For example, it is possible to cascade the programmable multiplexers and demultiplexers in the various cross connect embodiments described above, in order to increase the output port count of the devices from K to $K^2$ when two devices are cascaded.

I claim:

1. A cross connect for
   (i) receiving (a) at least one input WDM signal cumulatively comprising a first plurality of optical wavelength channels from a respective at least one remote optical communication system and (b) a second plurality of added optical wavelength channels, and
   (ii) generating (c) at least one output WDM signal cumulatively comprising a third plurality of optical wavelength channels comprising some of the optical wavelength channels in said first and second pluralities of optical wavelength channels, for transmission to a respective at least one remote optical communication system and (d) a fourth plurality of dropped optical wavelength channels contained in said first plurality of optical wavelength channels, for transmission to a local destination,
   said cross connect comprising
     a first plurality of programmable demultiplexers, each arranged to receive said at least one input WDM signal,
     a first plurality of programmable multiplexers, each arranged to provide said at least one output WDM signal,
     a second plurality of demultiplexers arranged to provide said fourth plurality of dropped optical wavelength channels,
     a second plurality of multiplexers arranged to receive said second plurality of added optical wavelength channels, and
     a plurality of linking fibers arranged to interconnect (a) an output from each one of the programmable demultiplexers in said first plurality of programmable demultiplexers, to the input of one of the demultiplexers in said second plurality of demultiplexers, (b) an output from each one of the programmable demultiplexers in said first plurality of programmable demultiplexers, to the input of one of the programmable multiplexers in said first plurality of programmable multiplexers, and (c) an output from each one of the multiplexers in said second plurality of multiplexers, to the input of one of the programmable multiplexers in said first plurality of programmable multiplexers.

2. The invention defined in claim 1 wherein said cross connect further includes first and second auxiliary cross connect switches, and wherein
   said first auxiliary cross connect switch is arranged to concentrate the outputs of said second plurality of demultiplexers to generate said fourth plurality of dropped optical wavelength channels, and
   said second auxiliary cross connect switch is arranged to distribute said second plurality of added optical wavelength channels for input to said second plurality of multiplexers.

3. The invention defined in claim 1 wherein said programmable demultiplexers each have (a) a plurality of programmable demultiplexer output ports, and (b) a programmable demultiplexer input port for receiving said input WDM signal containing multiple optical wavelength channels, and wherein each of said programmable demultiplexers is arranged to independently distribute said multiple optical wavelength channels to said programmable demultiplexer output ports.

4. The invention defined in claim 1 wherein said programmable multiplexers each have (a) a plurality of programmable multiplexer input ports for independently receiving multiple optical wavelength channels, and (b) a programmable multiplexer output port, and wherein each of said programmable multiplexers is arranged to combine said multiple optical wavelength channels to generate said WDM signal at said programmable multiplexer output port.

5. An optical cross-connect switch, comprising:
   one or more programmable demultiplexers, each having a demultiplexer input port and a plurality of demultiplexer output ports;
   one or more primary combiners, each having a plurality of combiner input ports and a combiner output port; and
   one or more individual linking fibers, each connecting a demultiplexer output port to a combiner input port, wherein:
     each programmable demultiplexer is adapted to (i) receive a control signal and (ii) for each of one or more optical wavelength channels applied to the demultiplexer input port, route the channel to any demultiplexer output port selected based on the control signal; and
     an optical wavelength channel applied to a demultiplexer input port is routed to a desired combiner output port via a corresponding programmable demultiplexer, a corresponding linking fiber, and a corresponding primary combiner.

6. The invention defined in claim 5, wherein said one or more primary combiners are programmable multiplexers.

7. The invention defined in claim 5, wherein said one or more primary combiners are passive combiners.

8. The switch of claim 5, further comprising one or more add combiners, each having a plurality of combiner input ports and a combiner output port, wherein, for each add combiner, the combiner output port is connected to an input port of a corresponding primary combiner.

9. The switch of claim 8, wherein each add combiner is a programmable multiplexer.

10. The switch of claim 8, wherein, for each add combiner, each combiner input port is connected to a distributor cross-connect switch.

11. The switch of claim 5, further comprising one or more drop splitters, each having a splitter input port and a plurality of splitter output ports, wherein, for each drop splitter, the splitter input port is connected to an output port of a corresponding programmable demultiplexer.

12. The switch of claim 11, wherein each drop splitter is a programmable demultiplexer.

13. The switch of claim 11, wherein, for each drop splitter, each splitter output port is connected to a concentrator cross-connect switch.

14. An optical cross-connect switch, comprising:
   one more primary splitters, each having a splitter input port and a plurality of splitter output ports;
   one or more programmable multiplexers, each having a plurality of multiplexer input ports and a multiplexer output port; and
   one or more individual linking fibers, each connecting a splitter output port to a multiplexer input port, wherein:
      each programmable multiplexer is adapted to (i) receive a control signal and (ii) for each of one or more optical wavelength channels, establish, based on the control signal, a unique pathway from any selected multiplexer input port to the multiplexer output port; and
      an optical wavelength channel applied to a splitter input port is routed to a desired multiplexer output port via a corresponding primary splitter, a corresponding linking fiber, and a corresponding programmable multiplexer.

15. The switch of claim 14, wherein each programmable multiplexer is adapted to prevent combining at the multiplexer output port two optical wavelength channels having a same wavelength when said two channels are applied to two different multiplexer input ports.

16. The invention defined in claim 14, wherein said one or more primary splitters are passive splitters.

17. The switch of claim 14, further comprising one or more add combiners, each having a plurality of combiner input ports and a combiner output port, wherein, for each add combiner, the combiner output port is connected to an input port of a corresponding programmable multiplexer.

18. The switch of claim 17, wherein each add combiner is a programmable multiplexer.

19. The switch of claim 17, wherein the input ports of each add combiner are connected to a distributor cross-connect switch.

20. The switch of claim 14, further comprising one or more drop splitters, each having a splitter input port and a plurality of splitter output ports, wherein, for each drop splitter, the splitter input port is connected to an output port of a corresponding primary splitter.

21. The switch of claim 20, wherein each drop splitter is a programmable demultiplexer.

22. The switch of claim 20, wherein, for each drop splitter, each splitter output port is connected to a concentrator cross-connect switch.

23. The switch of claim 20, further comprising one or more add combiners, each having a plurality of combiner input ports and a combiner output port, wherein:
   for each add combiner, the combiner output port is connected to an input port of a corresponding programmable multiplexer;
   each add combiner is a programmable multiplexer;
   each drop splitter is a programmable demultiplexer; and
   each primary splitter is a programmable demultiplexer.

24. The switch of claim 23 wherein:
   the input ports of each add combiner are connected to a distributor cross-connect switch; and
   for each drop splitter, each splitter output port is connected to a concentrator cross-connect switch.

* * * * *

UNITED STATES PATENT AND TRADEMARK OFFICE
CERTIFICATE OF CORRECTION

PATENT NO.    : 6,738,540 B2
DATED         : May 18, 2004
INVENTOR(S)   : Dan Mark Marom It is certified that error appears in the above-identified patent and that said Letters Patent is hereby corrected as shown below:

Column 11,
Line 19, replace "One more primary splitters," with -- one or more primary splitters, --.

Signed and Sealed this

Sixth Day of July, 2004

JON W. DUDAS
*Acting Director of the United States Patent and Trademark Office*